June 5, 1956  F. W. BROOKS  2,748,901
AUTOMATIC SLACK ADJUSTOR FOR BRAKES
Filed July 29, 1953  2 Sheets-Sheet 1
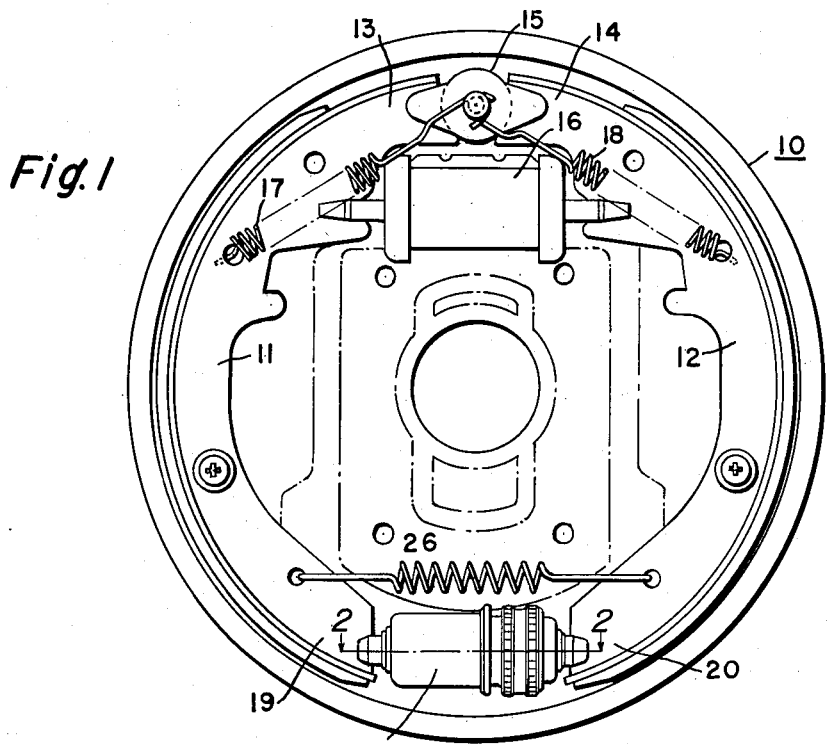
Fig.1
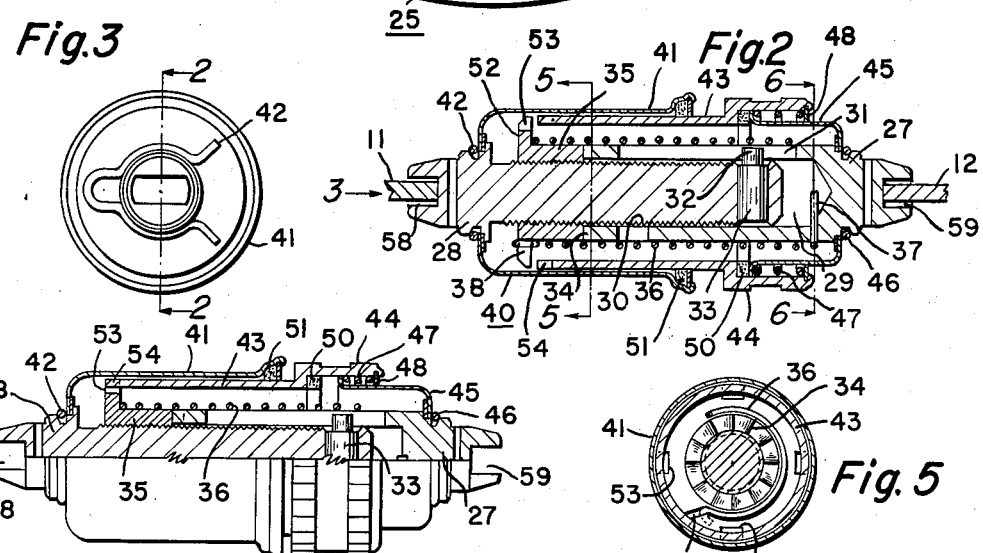
Fig.3  Fig.2
Fig.4  Fig.5
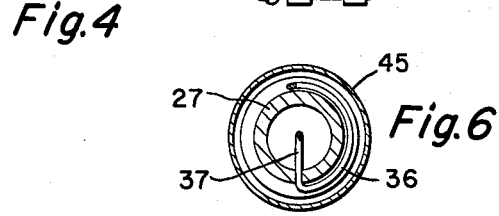
Fig.6
INVENTOR.
Frank W. Brooks
BY
Attorney June 5, 1956  F. W. BROOKS  2,748,901
AUTOMATIC SLACK ADJUSTOR FOR BRAKES
Filed July 29, 1953  2 Sheets-Sheet 2
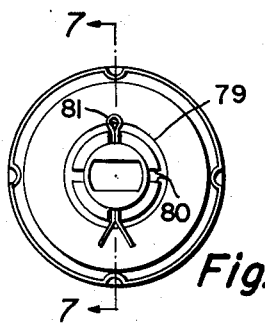
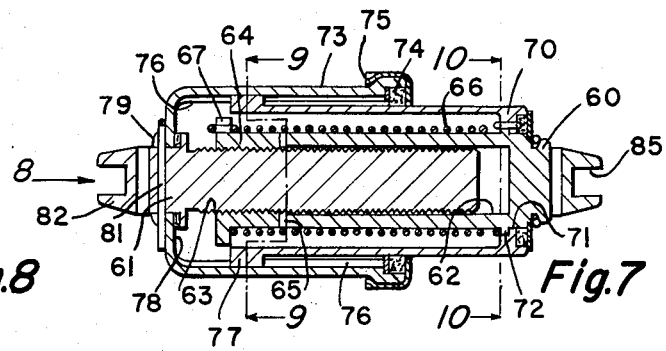
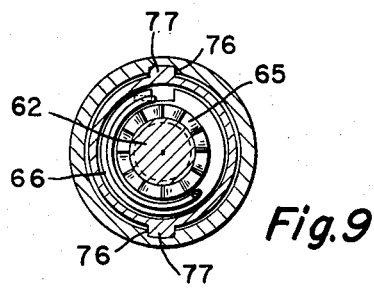
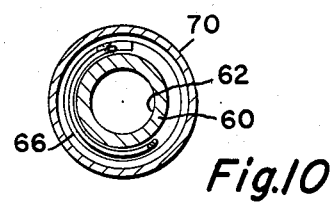
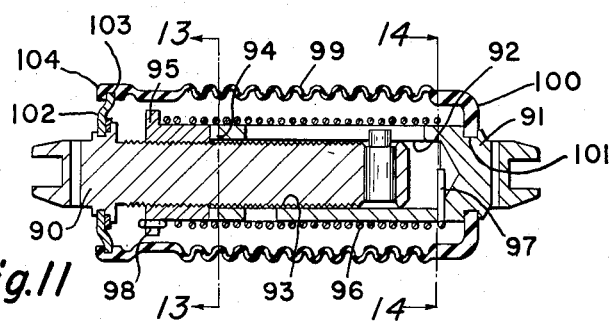
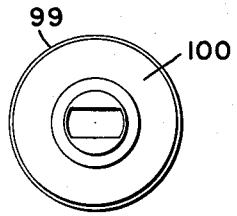
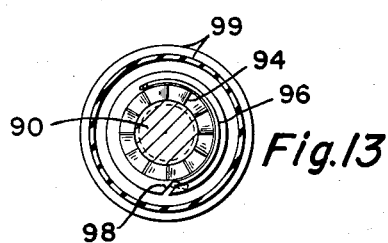
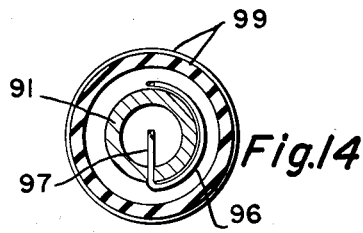
INVENTOR.
Frank W. Brooks
BY
Attorney United States Patent Office 2,748,901
Patented June 5, 1956

2,748,901

AUTOMATIC SLACK ADJUSTOR FOR BRAKES

Frank W. Brooks, Dayton, Ohio, assignor to General Motors Corporation, Detroit, Mich., a corporation of Delaware Application July 29, 1953, Serial No. 371,032

4 Claims. (Cl. 188—196)

This invention relates to brakes for automotive vehicles, and particularly to a brake lining wear compensating device that compensates automatically for wear of the brake lining.

An adjusting device for compensating automatically for wear of the lining elements of a brake gradually spreads the brake shoes of a brake to compensate for the lining wear. In doing so, the length of the wear compensating device increases so that when new brake linings are installed in a brake it is necessary that the wear adjusting device be reset to its initial length.

Also, under adverse conditions, the brake lining causes the brake drum to wear resulting in formation of a recess in the brake drum of a width equal to that of the brake lining. Thus, under many circumstances where a brake lining is worn considerably, the brake drum will also be worn to the extent that the depression formed in the brake drum surface by the lining will not allow a fully expanded brake assembly to be withdrawn from the brake drum.

Since it is the purpose of automatic wear compensating devices to maintain substantially uniform the clearances between a brake drum and a brake lining, such conditions result in a brake assembly with the compensating device extended to a maximum amount so that the compensating device must be shortened in length before the brake assembly can be removed from the brake drum.

It is therefore an object of this invention to provide an automatic wear compensating device that is totally enclosed, to prevent dirt from entering the working mechanism of the device, and to provide means on the device whereby the compensating device can be shortened in length to permit partial retraction of the brake shoes relative to the brake drum sufficient to provide release of the brake shoes from the drum for axial removal of the brake assembly.

It is another object of the invention to provide a wear compensating device having an enclosing housing wherein a part of the enclosing housing is disengageable from the compensating device to provide for access to the automatic wear adjusting mechanism for manual adjustment thereof.

It is still another object of the invention to provide a wear compensating device with an enclosing housing wherein a part of the enclosing housing is operatively connected with the automatic wear adjusting mechanism of the device to provide for manual actuation of the automatic mechanism.

It is still a further object of the invention to provide an automatic wear compensating device in accordance with the foregoing object wherein the housing part that is engageable with the automatic wear adjusting mechanism is normally resiliently held out of engagement with the automatic mechanism, but which is manually engageable with the automatic mechanism to provide for manual adjustment of the same.

Further objects and advantages of the present invention will be apparent from the following description, reference being had to the accompanying drawings wherein a preferred form of the invention is clearly shown.

In the drawings:

Figure 1 is a side elevational view of a brake mechanism incorporating features of this invention.

Figure 2 is a cross sectional view taken along line 2—2 of Figure 1.

Figure 3 is an end elevational view of the device of Figure 2 as viewed from the left hand end thereof.

Figure 4 is a cross sectional view similar to Figure 2 but illustrating the mechanism in a position for manual resetting of the device.

Figure 5 is a transverse cross sectional view taken along line 5—5 of Figure 2.

Figure 6 is a transverse cross sectional view taken along line 6—6 of Figure 2.

Figure 7 is a cross sectional view of a modified arrangement of the wear adjusting device taken along line 7—7 of Figure 8.

Figure 8 is an end elevational view of the device of Figure 7, as viewed from the left hand end thereof.

Figure 9 is a transverse cross sectional view taken along line 9—9 of Figure 7.

Figure 10 is a transverse cross sectional view taken along line 10—10 of Figure 7.

Figure 11 is another modified arrangement of the wear adjusting device.

Figure 12 is an end elevational view of the device of Figure 11, as viewed from the right hand end thereof.

Figure 13 is a transverse cross sectional view taken along line 13—13 of Figure 11.

Figure 14 is a transverse cross sectional view taken along line 14—14 of Figure 11.

In this invention the brake consists of a brake drum 10 and a pair of brake shoes 11 and 12. The adjacent ends 13 and 14 of the brake shoes 11 and 12 engage an immovable anchor pin 15 secured to the back plate of the brake structure.

An applying device comprising an hydraulic wheel cylinder 16 is positioned between the adjacent ends 13 and 14 of the brake shoes 11 and 12 to move the same outwardly into frictional engagement with the drum 10. Retraction springs 17 and 18 extend between the brake shoes 11 and 12 respectively and the anchor pin 15.

Between the opposite adjacent ends 19 and 20 of the brake shoes 11 and 12 respectively there is positioned a wear adjusting device 25 that automatically compensates for wear of the brake lining or of the brake drum, or both. A spring 26 extends between the adjacent ends 19 and 20 of the brake shoes 11 and 12 to retain the ends of the brake shoes in engagement with opposite ends of the wear adjusting device 25.

The wear adjusting device is more particularly illustrated in Figures 2 through 8 inclusive and comprises the two primary parts 27 and 28, the part 27 supporting the part 28 in a manner that relative longitudinal movement is provided for between the parts, but rotational movement is prevented.

The part 27 is generally cylindrical in shape and has a cylindrical counterbore 29 that receives the part 28, the part 28 having the exterior surface provided with the screws or threads 30. The part 27 has a longitudinal slot 31 that receives the projecting end 32 of the pin 33 whereby relative rotation between the part 28 of the part 27 is prevented yet longitudinal movement is allowed. The forward end of the part 27 has a series of ratchet teeth 34 that is engaged by a corresponding series of ratchet teeth on the rotative member 35 carried on the worm or screw 30 on the part 28.

A torsion spring 36 has one end anchored to the part 27 by the spring end 37 extending into the part 27 as shown in Figure 2. The opposite end of the torsion spring 36 is secured to the rotative member 35, the end of the spring being placed in the slot 38 provided in the member 35. The torsion spring 36 thus tends to rotate the part 35 relative to the part 27 on the screw 30, but is prevented from doing so by the cooperating ratchet teeth 34 on the parts 27 and 35.

A multiple part telescoping housing 40 encloses the abutment mechanism heretofore described, the housing being provided to prevent accumulation of dirt on the operating mechanism of the abutment device.

As illustrated in Figure 2, the telescoping housing 40 comprises a housing member 41 that is secured to one end of the part 28 by means of a snap cotter key 42. A second housing part 43 has one end thereof telescopically received by the part 41 and has an enlarged end 44 that telescopically receives a housing part 45 secured to the part 27 by means of a retaining ring 46.

A compression spring 47 is placed between the housing part 45 and a retaining washer 48 carried in the enlarged portion 44 of the part 43 to retain normally the part 43 retracted relative to the rotative nut 35 in the manner illustrated in Figure 2. A seal member 50 is placed between the housing parts 45 and 43, and a corresponding seal member 51 is placed between the housing parts 43 and 41, thus excluding dirt from the interior of the housing.

The rotative member or nut 35 has a radially flanged portion 52 provided with serrations on the periphery thereof forming teeth-like projections 53. These teeth-like projections 53 are engaged by corresponding teeth-like projections 54 provided on the forward end of the housing part 43. The teeth-like projections 53 and 54 are normally retained out of engagement by action of the spring 47, as illustrated in Figure 2.

However, after the abutment mechanism has been extended by rotation of the rotative member 53 on the screw 30, as a result of the action of the torsion spring 36, the torsion of the spring 36 and the total length of the abutment device can be reset to their initial relationships by manually moving the housing member 43 in a left hand direction, as viewed in Figure 2, to cause engagement of the teeth-like projections 53 and 54. Thereafter manual rotation of the housing member 43 will cause rotation of the rotative member 35 in a reverse direction to re-wind the torsion spring 36, and in doing so, rotate the member 35 on the screw 30 to retract the screw within the nut 35.

The position of the elements for this manual resetting of the device is illustrated in Figure 4.

The automatic wear adjusting device 25 is placed between the adjacent ends 19 and 20 of the brake shoes 11 and 12 with the shoe 11 located in the slot 58 provided in the end of the member 28 while the shoe 12 has the end thereof engaging the slot 59 provided in the end of the member 27. Thus, when the device 25 is placed between the shoes 11 and 12, there is no rotative movement of the parts 28 and 27 relative to each other.

As the brake shoes 11 and 12 are expanded outwardly against the drum 10, the lower ends 19 and 20 of the shoes expand outwardly initially about the anchor pin 15 for an axis, the spring 36 being of lesser spring value than the retraction springs 17 and 18 to provide for this action.

So long as the initial expansion of the shoes 11 and 12 relative to each other is less than the depth of the ratchet teeth 34 of the adjusting mechanism, the adjusting mechanism is inactive. However, when the lining of the brake shoes 11 and 12 or the surface of the drum 10 is worn sufficiently to allow relative movement by the shoes 11 and 12 greater than the depth of the ratchet teeth 34, then the torsion spring 36 will cause rotation of the rotative member 35 upon the screw 30 to cause relative longitudinal movement by the members 28 and 27 to extend the total length of these members and thereby take up the increase movement of the brake shoes 11 and 12. This occurs automatically during the life of the brake linings on the brake shoes.

When the brake linings are to be replaced on the brake shoes 11 and 12 it is necessary that the total length of the abutment device 25 be shortened to allow for sufficient retraction of the brake shoes 11 and 12 to remove them out of the grooves that are many times formed by the linings in the drums as a result of abnormal wear conditions. To accomplish this, the housing member 43 is moved in a left hand direction, as viewed in Figure 2, to engage the teeth-like projections 53 and 54, as viewed in Figure 4. By rotating the housing member 43 manually the rotative member 35 can be rotated against the holding action of the ratchet teeth 34 in a reverse direction to cause retraction of the member 28 relative to the member 27 and re-winding of the torsion spring 36. When sufficient retraction movement has been given to the members 27 and 28 to allow the brake linings to clear the groove formed in the drum 10 the brake assembly can then be removed from the drum.

Upon removal of the brake assembly from the drum, the automatic wear adjusting device 25 can be reset to its initial position by rotating the member 35 in the manner just described.

In Figures 7 through 10 inclusive there is illustrated a slightly modified arrangement of the automatic wear adjusting device 25 wherein the adjusting device consists of the two parts 60 and 61. The part 60 is cylindrical in shape and has a cylindrical bore 62 that receives the screw or thread portion 63 of the part 61. A rotative member or nut 64 is placed on the screw 63.

The forward end of the part 60 has a series of ratchet teeth 65 thereon engaged by a corresponding series of ratchet teeth on a cooperating face of the rotating member 64.

A torsion spring 66 has one end thereof attached to the radial flange 67 on the rotative member 64, the opposite end of the spring 66 being secured to an enclosing housing part 70 that has a flange 71 cooperating with a flange 72 on the part 60 to provide for relative rotation between the part 60 and the housing part 70.

The housing part 70 telescopes within a housing part 73 with a seal member 74 placed therebetween and secured in position by a friction retainer 75. The housing part 73 has grooves 76 engaged by projections 77 provided on the housing part 70 to prevent relative rotation between the parts 70 and 73.

The housing part 73 is carried on the member 61 that projects through an opening in the forward wall 78 of the member 73. The wall 78 has a raised portion 79 provided with slots 80 that receive a cotter pin 81 that extends through the projecting end 82 of the member 61 whereby relative rotation between the housing part 73 and the member 61 is prevented.

The device illustrated in Figures 7 through 10 is placed in the brake in the same position as the device 25 illustrated in Figure 1, and functions to adjust the wear of the brake lining or brake drum in the same manner heretofore described.

To reset the device illustrated in Figure 7, a tool is inserted in the groove 85 to hold the member 60 stationary while the operator grasps the housing part 73 to rotate the same. Rotation of the housing part 73 causes rotation of the screw 63 within the rotative member 64 to shorten the overall length of the wear adjusting device, and concurrently return the tortion spring 66 to its initial position, the spring being secured to the housing part 70 that is rotated concurrently with the housing part 73.

In Figures 11 through 14 there is illustrated another modified form of the wear adjusting device that includes the two parts 90 and 91. The part 91 has the internal bore 92 that receives the screw or threaded portion 93 of the part 90. The forward end of the part 91 has a series of ratchet teeth 94 that engage a corresponding cooperating series of ratchet teeth on the rotating member 95 carried on the screw 93. The tortion spring 96 has one end thereof anchored to the part 91 by the spring end 97 extending into the part 91. The opposite end of the tortion spring 96 is secured to the rotative member 95, the spring end extending into a slot 98 provided in the member 95.

The operating mechanism heretofore described is enclosed by an extensible housing 99 that is made of rubber-like material, the housing 99 having a corrugated portion to provide for extension and contraction thereof. One end of the housing 99 has an end wall 100 that is secured to the part 91 in an annular groove 101 provided therein. The opposite end of the housing 99 is supported by a disk 102 the outer periphery of which is received within a groove 103 provided in the rubber-like housing 99.

To gain access to the operating mechanism, the end 104 of the housing 99 can be disengaged from the disk 102 which allows sufficient contraction of the housing 99 to gain access to the rotative member 95 for manual adjustment of the same to reset the mechanism to its original position.

While the form of embodiment of the invention as herein disclosed constitutes a preferred form, it is to be understood that other forms might be adopted as may come within the scope of the claims which follow.

What is claimed is as follows:

1. A slack adjustor for a brake, comprising, two members one supporting the other to provide for relative longitudinal movement without rotative movement with one of the said members having one end adapted to be attached to a brake shoe and including ratchet teeth disposed at its other end, the other of said members having one end adapted to be attached to an adjacent brake shoe and including a screw supporting a rotative member thereon, said rotative member having ratchet teeth normally engaging the ratchet teeth on the said one member whereby rotation therebetween is prevented, torsion means having one end anchored to said one member and the other end to said rotative member to rotate said rotative member on said other member upon longitudinal movement between the said two members sufficient to separate the ratchet teeth, a multiple part telescoping housing with the parts thereof axially movable relatively and enclosing said two members with the ends of said two members each connected to one of the housing parts and projecting from opposite ends of said housing for attachment to adjacent ends of brake shoes, and means between said housing and said members to effect axial change in total length of said two members by rotation of said housing.

2. A slack adjuster for a brake, comprising, two members one supporting the other to provide for relative longitudinal movement without rotative movement with one of the said members having one end adapted to be attached to a brake shoe and including ratchet teeth disposed at its other end, the other of said members having one end adapted to be attached to an adjacent brake shoe and including a screw supporting a rotative member thereon, said rotative member having ratchet teeth normally engaging the ratchet teeth on the said one member whereby rotation therebetween is prevented, torsion means having one end anchored to said one member and the other end to said rotative member to rotate said rotative member on said other member upon longitudinal movement between the said two members sufficient to separate the ratchet teeth, a multiple part telescoping housing with the parts thereof axially movable relatively and enclosing said two members with the ends of said two members each connected to one of the housing parts and projecting from opposite ends of said housing for attachment to adjacent ends of brake shoes, and means between said housing and said members to effect relative rotation between the said other of said members and said rotative member by rotation of said housing to effect axial change in total length of said two members.

3. A slack adjustor in accordance with claim 1 in which one of said housing parts is movable into driving engagement with said rotative member to effect rotation thereof upon rotation of the said one housing part and includes resilient spring means maintaining said one housing part normally out of driving engagement with said rotative member.

4. A slack adjustor in accordance with claim 1 in which one of said housing parts is drivingly connected with the said member having the screw to effect rotation thereof relative to said rotative member.

References Cited in the file of this patent

UNITED STATES PATENTS

| | | |
|---|---|---|
| 1,157,721 | Price | Oct. 26, 1915 |
| 2,216,861 | Swift | Oct. 8, 1940 |
| 2,222,858 | Ryan | Nov. 26, 1940 |
| 2,255,260 | Loweke | Sept. 9, 1941 |
| 2,695,078 | Brooks | Nov. 23, 1954 |

FOREIGN PATENTS

| | | |
|---|---|---|
| 630,340 | France | Aug. 20, 1927 |